Figure 1:
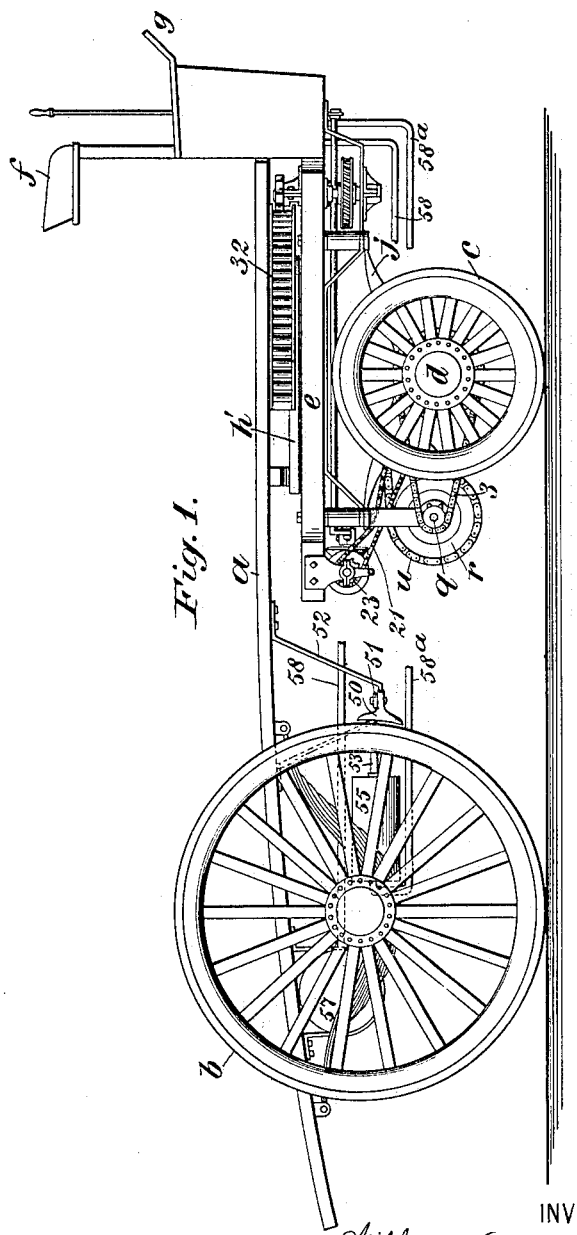

No. 758,705. PATENTED MAY 3, 1904.
W. O. SHADBOLT & S. J. WETMORE.
MOTOR VEHICLE.
APPLICATION FILED FEB. 12, 1901. RENEWED OCT. 7, 1903.
NO MODEL. 5 SHEETS—SHEET 1.

WITNESSES:
L. N. Legendre
Peter N. Ross

INVENTORS:
William Oscar Shadbolt
Sylvester J. Wetmore
BY
Henry Connett
ATTORNEY.

No. 758,705. PATENTED MAY 3, 1904.
W. O. SHADBOLT & S. J. WETMORE.
MOTOR VEHICLE.
APPLICATION FILED FEB. 12, 1901. RENEWED OCT. 7, 1903.
NO MODEL. 5 SHEETS—SHEET 2.

WITNESSES:
L. N. Legendre
Peter R. Ross

INVENTORS:
William Oscar Shadbolt
Sylvester J. Wetmore
BY
ATTORNEY

No. 758,705. PATENTED MAY 3, 1904.
W. O. SHADBOLT & S. J. WETMORE.
MOTOR VEHICLE.
APPLICATION FILED FEB. 12, 1901. RENEWED OCT. 7, 1903.
NO MODEL. 5 SHEETS—SHEET 3.
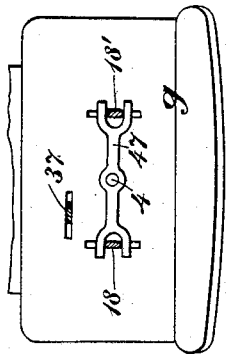
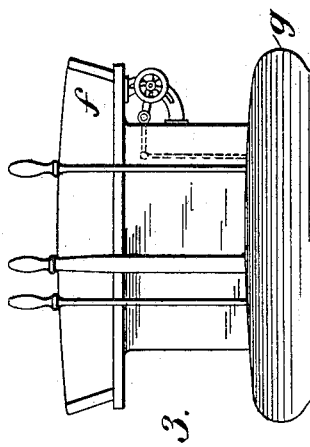
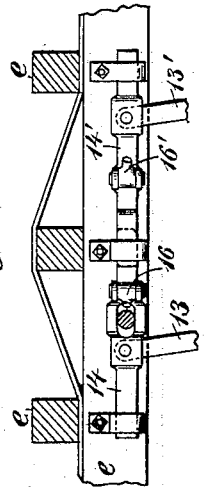
WITNESSES:
L. A. Legendre
Peter A. Ross
INVENTORS:
William Oscar Shadbolt
Sylvester J. Wetmore
BY
Henry Connett
ATTORNEY No. 758,705. PATENTED MAY 3, 1904.
W. O. SHADBOLT & S. J. WETMORE.
MOTOR VEHICLE.
APPLICATION FILED FEB. 12, 1901. RENEWED OCT. 7, 1903.
NO MODEL. 5 SHEETS—SHEET 4.
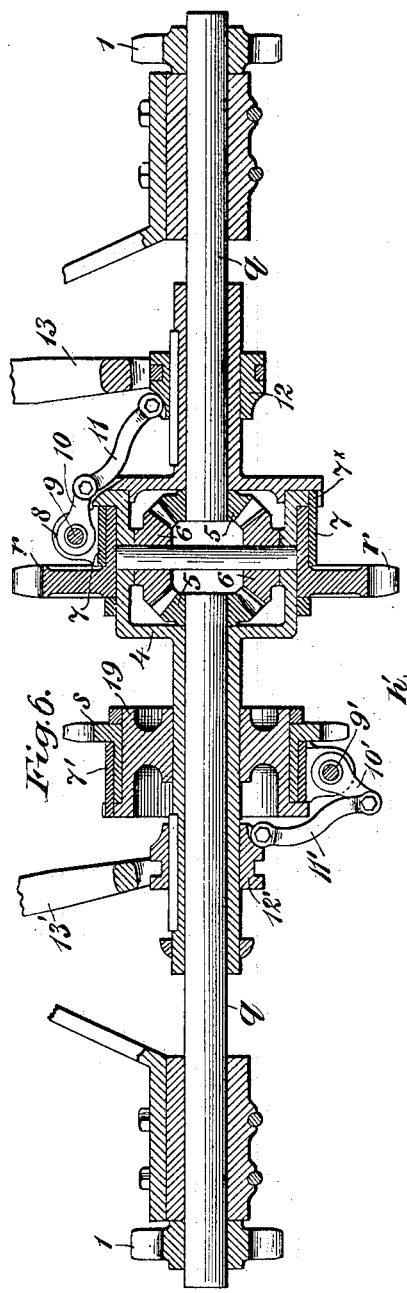
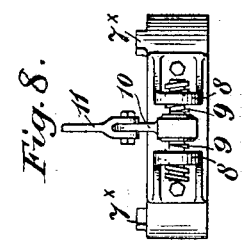
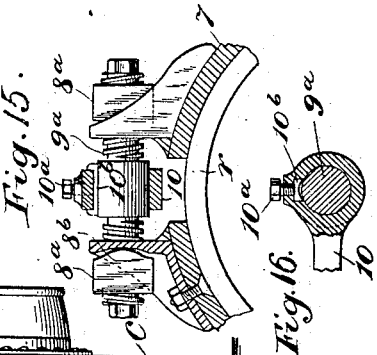
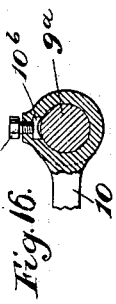
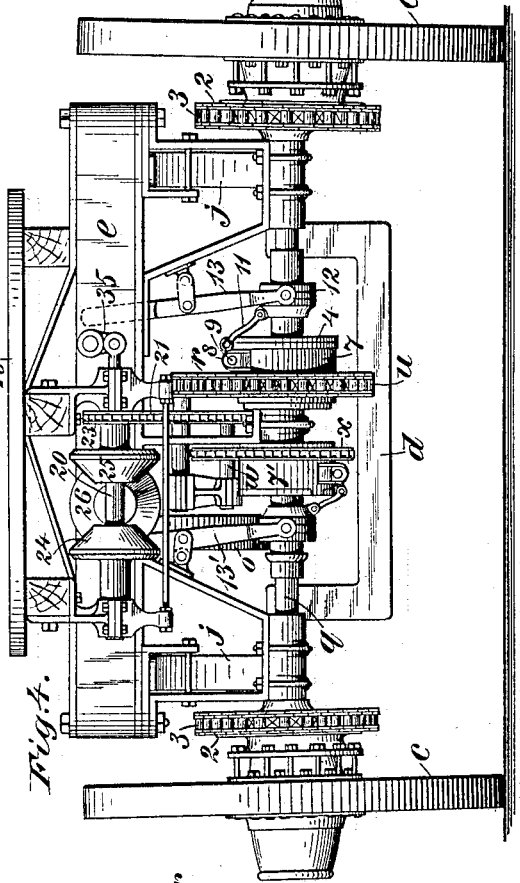
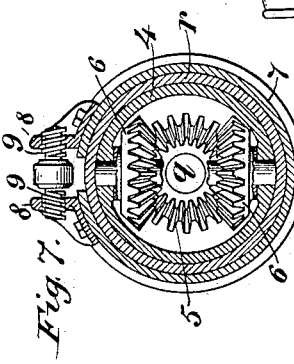
WITNESSES:
L. N. Legendre
Peter A. Ross.
INVENTORS:
William Oscar Shadbolt
Sylvester J. Wetmore
BY
Henry Connett
ATTORNEY
THE NORRIS PETERS CO., PHOTO-LITHO., WASHINGTON, D. C.

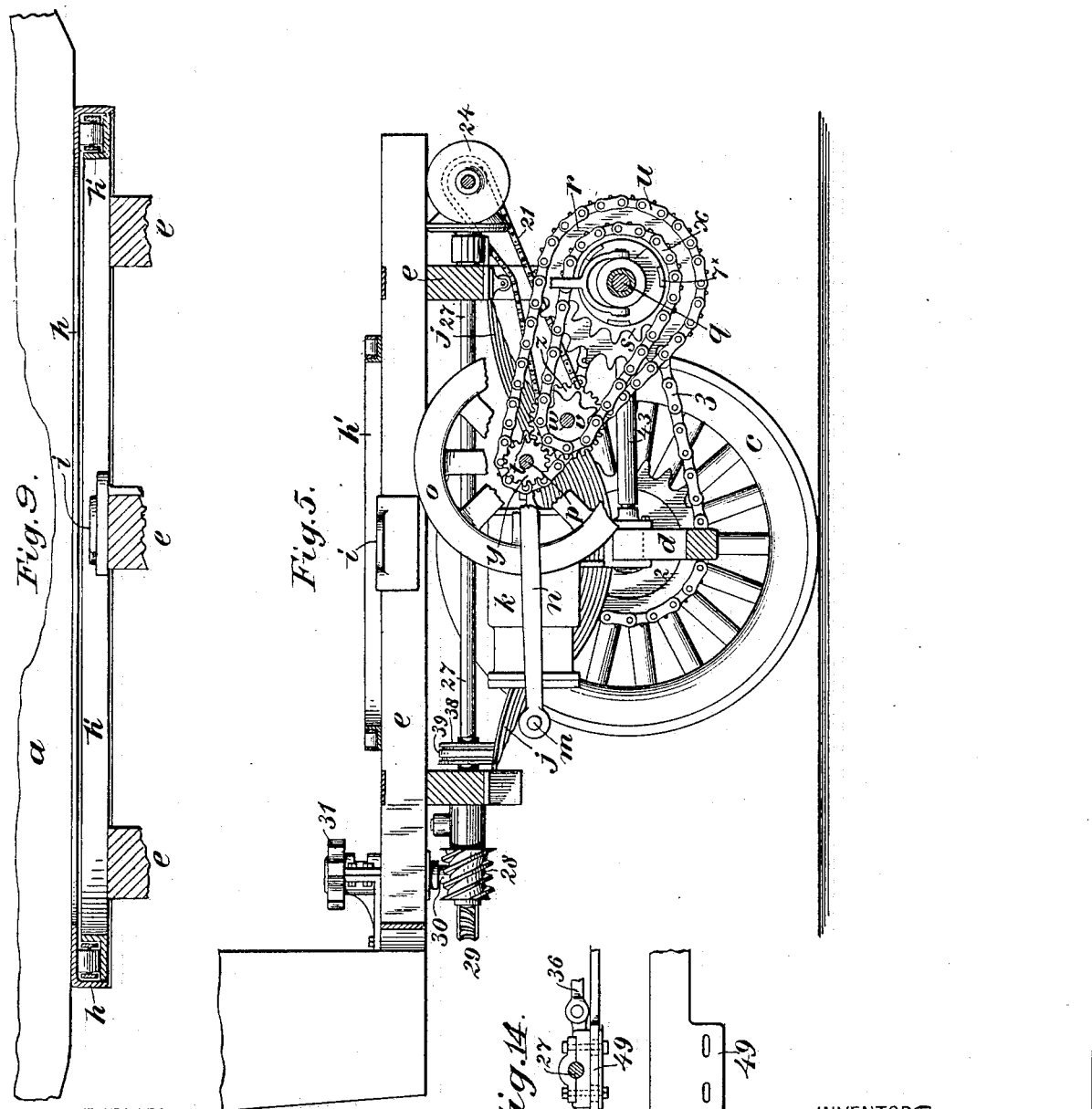

No. 758,705. Patented May 3, 1904.

UNITED STATES PATENT OFFICE.

WILLIAM OSCAR SHADBOLT AND SYLVESTER J. WETMORE, OF BROOKLYN, NEW YORK, ASSIGNORS TO SHADBOLT MANUFACTURING COMPANY, OF BROOKLYN, NEW YORK.

MOTOR-VEHICLE.

SPECIFICATION forming part of Letters Patent No. 758,705, dated May 3, 1904.

Application filed February 12, 1901. Renewed October 7, 1903. Serial No. 176,153. (No model.)

*To all whom it may concern:*

Be it known that we, WILLIAM OSCAR SHADBOLT and SYLVESTER J. WETMORE, citizens of the United States, and residents of New York city, borough of Brooklyn, county of Kings, and State of New York, have invented certain new and useful Improvements in Motor-Vehicles, of which the following is a specification.

This invention relates to the class of four-wheeled motor-vehicles wherein the front axle, which is non-rotative, turns about a king-bolt for steering and the wheels which are driven turn on the axle-arms.

In the present construction any suitable form or kind of motor may be employed, and the invention while adapted to be applied to motor-vehicles for any and all purposes is especially well adapted for trucks and business-wagons generally.

The principal characteristics of this invention are these: The entire driving mechanism is carried by the fifth-wheel frame, its center of gravity being practically over the front axle. The turning of the front axle about the king-bolt in either direction for steering or directing the course of the vehicle is effected by the motor of the vehicle, but is controlled by the hand of the driver. The main or engine shaft may rotate continuously in one direction, this motion being communicated through gears to a jack-shaft or counter-shaft for driving ahead or backing.

Figure 2:
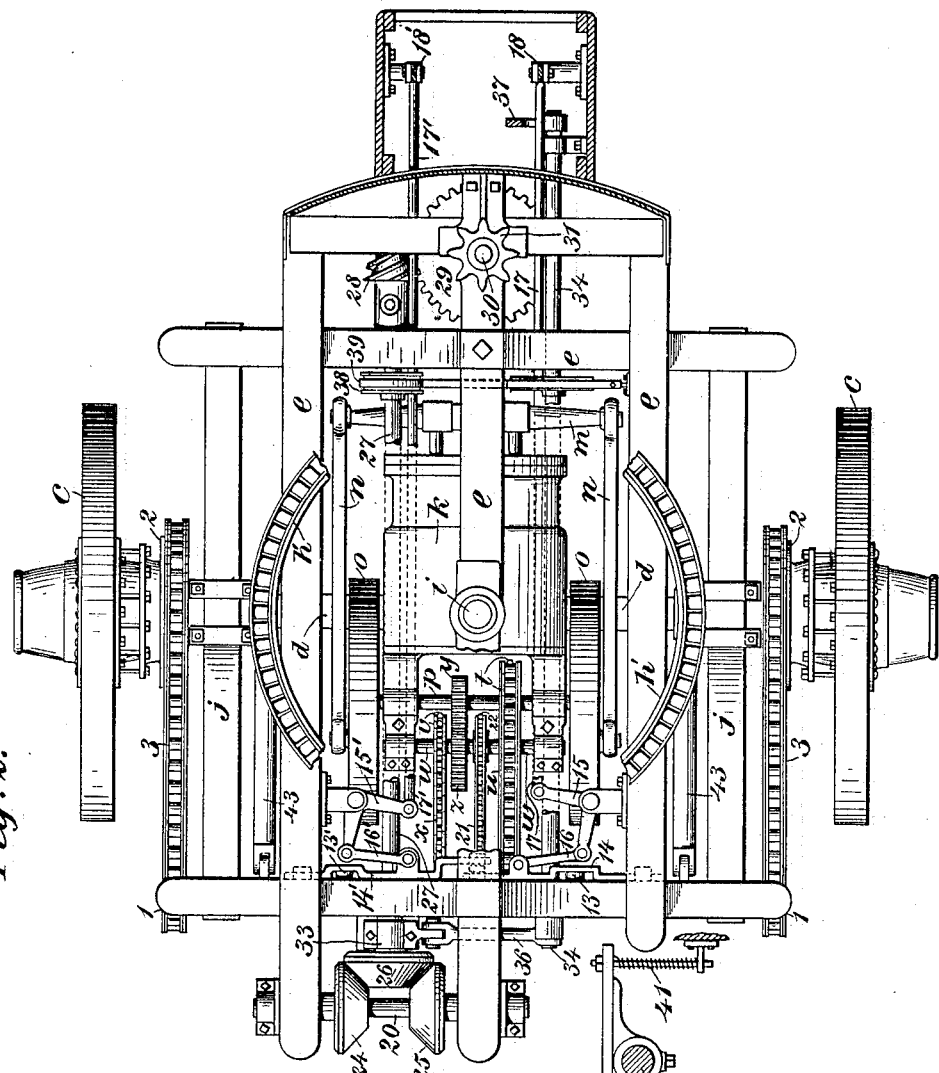
Figure 10:
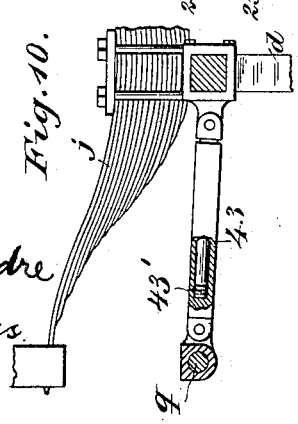
Figure 11:
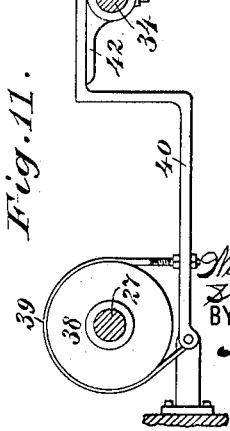

In the accompanying drawings, which serve to illustrate an embodiment of the invention, Figure 1 is a side elevation on a relatively small scale of a truck provided with the invention. Fig. 2 is a plan of the mechanism, including the fifth-wheel frame and front wheels. Fig. 3 is a front elevation of the parts seen in Fig. 2 and the driver's seat. Fig. 4 is a rear elevation of the parts seen in Fig. 2. Fig. 5 is a sectional side elevation taken from the side opposite to that represented in Fig. 1. Fig. 6 is an enlarged view of the jack-shaft, showing the parts mounted thereon in section. Fig. 7 is a transverse section through the box 4 in Fig. 9, and Fig. 8 is a plan view of the clutch-band detached. Fig. 9 is a transverse section of the fifth-wheel rings. Fig. 10 is a detached view showing one of the adjustable braces between the front axle and the bearings of the jack-shaft. Fig. 11 is a detached view of the brake for the steering-shaft. Fig. 12 is a fragmentary view showing the slides 14 and 14'. Fig. 13 is a plan view of the foot-rest $g$, showing the coupling of the levers 18 and 18'. Fig. 14 includes two views of the sliding bearing for the shaft 27. Fig. 15 shows the preferred construction of the device for tightening the band of the clutch device; and Fig. 16 is a cross-section of the screw thereof, showing the means for securing the arm thereon.

Referring to Fig. 1, $a$ designates a truck-body, which may of course be substituted by any form of vehicle-body. $b$ designates the hind or rear vehicle-wheels. $c$ designates the front vehicle-wheels. $d$ is the front axle. $e$ is the fifth-wheel frame. $f$ is the driver's or motorman's seat, mounted on the frame $e$, and $g$ is the foot-rest. $h$ is the upper fifth-wheel ring secured to the body $a$, and $h'$ is the lower fifth-wheel ring, mounted on the frame $e$.

In Fig. 2, $i$ is the king-bolt, about which the frame $e$ turns. $j$ designates the springs between the front axle $d$ and the frame $e$.

The driving mechanism will now be described. This mechanism is all suspended from the fifth-wheel frame $e$ over the front axle $d$.

The motor which is herein shown somewhat diagrammatically is a two-cylinder gas-engine or engine of the explosion type, using a volatile hydrocarbon as gasolene, the vapor of which is mixed with air and compressed for explosion.

It will suffice to say of the motor that so far as this invention is concerned it may be of any kind or type.

$k$ is the cylinder. The cross-head $m$ is coupled by connecting-rods $n$ with pins in crank-wheels $o$, fixed on the driving-shaft $p$. The shaft $p$ is driven continuously in one direction, and from it motion and power are derived for driving the vehicle through a jack-shaft $q$.

It may be stated here summarily that on the jack-shaft are loosely mounted two sprocket-wheels $r$ and $s$, the former for forward driving and the latter for backing or rear driving, and that means are provided for clutching either of these wheels to the jack-shaft at will, as will be more fully described hereinafter. The wheel $r$ is driven directly from the main shaft $p$ through a sprocket-wheel $t$ on the shaft $p$ and a chain $u$, while the wheel $s$ is driven in the opposite direction from the wheel $r$ through a sprocket-wheel $v$ on an intermediate shaft $w$ and a chain $x$, the shaft $w$ being driven through toothed wheels $y$ and $z$ on the shafts $p$ and $w$, respectively. On the respective ends of the jack-shaft are fixed sprocket-wheels 1, which are connected for driving with sprocket-wheels 2 on the respective front wheels $c$ of the vehicle by chains 3.

The construction of the jack-shaft $q$ and the means for clutching the wheels $r$ and $s$ thereon will now be described with especial reference to Figs. 6, 7, and 8. In order that the two front wheels of the vehicle may rotate at different speeds or even in opposite directions in turning the vehicle, for example, the jack-shaft $q$ is made up of two alined sections, each carrying one of the sprocket-wheels 1, and the adjacent ends of these shaft-sections are housed in a box 4, in which said extremities of the shaft-sections find bearings. On each shaft-section within the box 4 is secured a miter or bevel wheel 5, and the teeth of these wheels mesh or gear with the teeth at opposite sides of two similar bevel-wheels 6, rotatively mounted in the box 4, with their common axis of rotation perpendicular to the axis of the jack-shaft. Only one wheel 6 is really necessary; but two are preferable to balance the strain. The box 4 rotates with the jack-shaft normally. As herein shown, the periphery of the box 4 forms a journal for the sprocket-wheel $r$, on which the latter turns loosely, its boss or hub being embraced by a spring brake-band 7. This band has at each end a nut 8, and with these nuts engages a right-and-left clamping-screw 9. By rocking this screw in the proper direction it acts to draw the nuts toward each other, and thus cause the band 7 to tightly embrace the hub of the wheel $r$. On the screw 9, at its middle, between the two nuts 8, is fixed a short arm 10, to which is coupled one end of an operating-link, 11, the other end of which is coupled to a circumferentially-grooved collar 12 splined on the sleeve forming part of the box 4. Fulcrumed on the frame $e$ is an upright lever 13, the lower end of which has a fork embracing the collar 12, and the upper end of which engages a slot or keeper in a slide 14 on the frame $e$. The moving of the slide 14 in one direction acts through the lever 13 to slide the collar 12 along the box-sleeve in the opposite direction, and this movement of the collar acts, through the link 11, to rock the screw 9 and draws the brake strap or band 7 tightly about the boss or the sprocket-wheel $r$, thus compelling the latter to drive the jack-shaft $q$.

To compel the band 7 to rotate positively with the box 4, the said band has on its margin one or more lugs $7^x$, Fig. 8, which engage radial slots formed in a flange on the box 4 adjacent to the band. These lugs and slots permit the band 7 to expand and contract freely; but the engagement of the lugs with the slots in the box compel said band and box to rotate together at all times. It is on these lugs that the strain in driving comes, so there may be any number of them and they may be of any desired width.

To operate the slide 14 from the driver's seat, the following intermediate mechanism is employed: One arm of an elbow-lever 15 on the frame $e$ is coupled by a link 16 with the slide 14, and the other arm thereof is coupled to a rod 17, which extends forward to a point below the driver's seat $f$ and is there coupled to the lower end of a hand-operated lever 18.

The backing sprocket-wheel $s$ is mounted rotatively on a boss 19, secured to and forming a substantial part of the sleeve of the box 4, and there are provided means which, as herein shown, are precisely the same as those described with respect to the wheel $r$ for connecting said wheel to the jack-shaft for driving backward. It will suffice to briefly enumerate these parts, the same characters, with an additional prime-mark, being employed to designate them. $7'$ is the band embracing the boss of the wheel $s$. $9'$ is the clamping-screw. $10'$ is the arm on same. $11'$ is the operating-link. $12'$ is the splined collar on the sleeve of the box 4, and $13'$ is the upright lever engaging the collar below and a slide $14'$ above. There is an elbow-lever $15'$ coupled to the slide $14'$ by a link $16'$ and a rod $17'$ connecting the other arm of said elbow-lever with the lower arm of an operating-lever $18'$ at the driver's seat $f$. By means of the lever 18 the driver or motorman may set the vehicle going ahead, and by means of the lever $18'$ he may set the vehicle in motion backward.

The means for steering or guiding the vehicle will now be described.

Mounted rotatively on the fifth-wheel frame $e$ at the back is a shaft 20, extending transversely or parallel with the shaft $w$, and this shaft is driven from the shaft $w$ through a chain 21 on sprocket-wheels 22 and 23 on the respective shafts $w$ and 20. Consequently the shaft 20 rotates continuously in one direction so long as the motor is running. On the shaft 20 are secured two friction bevel-wheels 24 and 25, and between these wheels is a friction bevel-wheel 26, which is normally just out of contact with the wheels 24 and 25, but may be put in contact with either by a slight lateral or sidewise movement. The wheel 26 is secured on a shaft 27, which extends forward and carries a worm 28 at its front end, said worm gearing with a worm-wheel 29 on an upright shaft 30, rotatively mounted in the frame e. On the upper end of this shaft 30 is secured a pinion 31, which gears with the teeth on a semicircular rack 32, Fig. 1, fixed to the under side of the vehicle-body a concentrically with the king-bolt i. The shaft 27 is so mounted that its bearing 33 at the rear end may be shifted a little laterally, so as to put the wheel 26 into frictional contact with either one of the wheels 24 and 25, one of which drives the wheel 26 in one direction and the other drives it in the opposite direction. To press the wheel 26 into driving contact with either of the said wheels 24 or 25, there is a rock-shaft 34, mounted in the frame e and extending from front to rear. On the rear end of this shaft is a crank-arm 35, coupled by a link 36 to the shifting bearing 33. At its forward end the shaft 34 has an upright operating-lever 37, extending up to a point where it can be reached by the driver for rocking the shaft 34.

The operation of steering is simple. When the vehicle is in motion and the driver wishes to change its direction, he moves the lever 37 to one side or the other, thus rocking the shaft 34 and through the link 36 pressing the wheel 26 into operative contact with one of the rotating bevel-wheels 24 or 25. This sets the shaft 27 to rotating and through the worm 28 and worm-wheel 29 it rotates the shaft 30. The pinion 31 on this shaft rolls about the rack 32, and thus turns the front axle d, the wheels, and all the parts carried by the axle about the king-bolt i.

It is desirable that when the vehicle is running straight ahead—that is, with the front axle at right angles to the longitudinal axis of the vehicle—the pinion 31 in gear with the rack 32 shall be held somewhat firmly against rotation in order that the front axle shall not turn about the king-bolt by a front wheel striking a stone or the like, and to provide means for locking said pinion against rotation under such conditions the device seen detached in Fig. 14 may be employed. On the shaft 27 is secured a brake-wheel 38, and about this wheel is a brake-strap 39, fixed at one end and secured at the other end to a brake-lever 40. This lever is acted upon by a spring 41 in such a manner as to draw the strap 39 forcibly about the wheel 38, and thus prevent the shaft 27 from rotating in either direction. Of course if the shaft 27 is held against rotation the pinion 31 cannot rotate, and by the intermeshing of its teeth with those of the rack 32 the fifth-wheel frame becomes locked to the vehicle-body.

In order that the strap 39 may be slackened when the shaft 27 is to be set in motion for steering, the lever 40 takes over a cross-piece 42, secured on the rock-shaft 34, whereby the rocking of said shaft in either direction serves to lift the lever 40 and slack the brake-strap. Moreover, the position of the lever 40 over the cross-piece 42 serves to hold the rock-shaft 34 steady, with the wheel 26 out of contact with both the driving-wheels 24 and 25 or in its normal position.

It will be noted that the spring 41 and lever 40 act on the cross-piece 42 automatically, when the lever 37 is released by the driver or chauffeur to arrest the operation of the steering mechanism by moving the cone-wheel 26 out of contact with both of the wheels 24 and 25.

As the axle d is connected to the frame e through the springs j, it is of course free to play a little forward and back under the frame e. Hence we find it desirable to provide distancing-braces 43, Fig. 10, between the said axle and jack-shaft q, so as to keep the chains 3 taut. These braces may be made adjustable or extensible longitudinally by one member of the brace telescoping in the other.

In order that the operating-levers 18 and 18' may be connected for operation, so that when the vehicle is running ahead, for example, the operation of the lever 18' for reversing or backing will first disengage the clutch device of the wheel r. To effect this, the coupling device 47 (seen in Fig. 13) is employed. This device is in the nature of a lever fulcrumed at 48 on the foot-rest platform and provided at its ends with forks to engage the levers 18 and 18'. When the vehicle is not running, the lever 47 will occupy the position seen in in Fig. 13. Obviously any coupling means may be employed for this purpose, that shown being one simple form. Obviously also one lever only of the two operating-levers need extend above the coupling device; but it is preferred to employ two.

In Fig. 14 the slotted plate 49, supporting the sliding bearing 33 of the shaft 27, is illustrated, and in Fig. 12 the slides 14 and 14' are seen in elevation, as seen from the front of the vehicle.

The box 4, its sleeve, and the boss 19 may be considered as parts of the jack-shaft so far as the wheels r and s are concerned and so far as the sliding collars 12 and 12' are concerned.

It is convenient to mount the wheel r on the box 4 as a journal instead of directly on the jack-shaft. It is convenient also to use with the construction shown an ordinary king-bolt for the forward running-gears to turn about under the body in steering; but by the term "king-bolt" as herein used is meant any device about which said running-gear may turn. It is also convenient to mount the motor on the fifth-wheel frame and to support said frame on springs; but the present invention is not necessarily limited to this construction.

One important feature of the invention is the mounting of the driver's or motorman's seat on the fifth-wheel frame instead of on the vehicle-body, whereby the mechanism through which the motorman controls the vehicle is carried with the mechanism it controls.

In Fig. 1 is shown a brake for the hind wheels b. As this brake is not herein claimed, it will suffice to say that the brake-shoes 50, carried by transverse brake-levers 51, fulcrumed on brakets 52 on the vehicle-body, are set by means of a piston-rod 53, the piston of which plays in a brake-cylinder 55, supported under the body. This cylinder is supplied with a compressed-air reservoir 57, connected with the brake-cylinder by a pipe 58. This pipe extends from the reservoir forward to the driver's seat and thence back to the brake-cylinder, means being provided for supplying the air at will by the driver.

We have not deemed it necessary to show and describe the appurtenances of the motor for supplying it and for stopping and starting it. These are well known, and they will necessarily vary with the character of the motor. It need only be said that if a gasolene explosive-motor is employed the vehicle will carry a tank or vessel of gasolene for supplying it, and this vessel may be placed where it is most convenient to have it.

The brace 43, Fig. 10, is not of course limited to construction where springs are interposed between the axle and the fifth-wheel frame. It may be employed in any construction where the jack-shaft and axle are capable of being pressed or held apart for maintaining the proper tension on the driving sprocket-chains. The outer member of the brace 43 is broken away in Fig. 10 to show how the brace may be lengthened by merely inserting obstacles or disks 43' at the bottom of the socket therein for the end of the inner member to bear on. This inner member fits rather loosely or freely in said socket. Preferably the ends of the parts of the brace 43 are hinged to the respective axle and jack-shaft so as to allow of some vertical movement of the said axle and shaft without undue strain.

Where the right-and-left screw 9 of Figs. 7 and 11 fits rather loosely in the nuts 8, which in these views are rigidly connected to the ends of the bands 7, and the movement in clutching is slight, the construction shown in these figures will serve; but we prefer the construction seen in Figs. 15 and 16, where the nuts $8^a$ are separate from the end pieces on the strap and have rounded faces $8^b$, which permit the nuts to rock, and thus the better maintain their alinement with the screw. Also in order that the screw $9^a$ may be turned independently of the arm 10 for carefully adjusting the strap 7 to the surface of the boss of the wheel $r$ the said arm is secured to the body of the screw by means of a set-screw $10^a$, which bears on a biting-plate $10^b$, which bites into the said body. Thus by loosening the said set-screw $10^a$ the clamping-screw $9^a$ may be turned in the nuts $8^a$ by means of an appropriate tool applied to a square $9^b$ or the like, formed on one end of the screw $9^a$.

Having thus described our invention, we claim—

1. A motor-vehicle having a non-rotative front axle, fifth-wheels, a fifth-wheel frame supported on the front axle, a king-bolt or the like about which said frame and axle turn in steering or guiding the vehicle, the front wheels, rotative on arms on said axle, a motor supported by said frame, a driver's seat supported on the same frame with the motor, and gearing between the motor-shaft and the respective front wheels whereby they are driven, substantially as set forth.

2. A motor-vehicle, having a non-rotative front axle, fifth-wheels, a fifth-wheel frame supported on the front axle, a king-bolt or the like about which said frame and axle turn in steering or guiding the vehicle, the front wheels, rotative on arms on said axle, a motor carried by the frame, a seat supported on the same frame with the motor, a jack-shaft, gearing between the motor-shaft and said jack-shaft for driving the latter, and gearing between said jack-shaft and the respective front wheels for driving the latter, substantially as set forth.

3. A motor-vehicle having a non-rotative front axle, fifth-wheels, a fifth-wheel frame supported on the front axle, a king-bolt or the like about which said frame and axle turn in steering or guiding the vehicle, the front wheels, rotative on arms on said axle, a motor carried by the frame, a seat supported on the same frame with the motor, a jack-shaft in two alined sections connected by a compensating gear, the said gear, gearing between the motor-shaft and said jack-shaft for driving the latter, and gearing between the sections of said jack-shaft and the respective front wheels for driving the latter, substantially as set forth.

4. A motor-vehicle having fifth-wheels, a fifth-wheel frame, a non-rotative front axle on which said frame is supported, a king-bolt or the like about which said frame and the front axle turn in steering or guiding the vehicle, the front wheels, rotative on arms on the front axle, a steering mechanism adapted for turning the fifth-wheel frame about its pivot, a motor carried by said frame, a driver's seat also carried by said frame, and gearing between the motor-shaft and the front wheels for driving the latter, substantially as set forth.

5. A motor-vehicle having fifth-wheels, a fifth-wheel frame, a non-rotative front axle connected to and supporting said frame, a king-bolt or the like about which said front axle turns in steering or guiding the vehicle, the front wheels, rotative on arms on the front axle, a motor carried by the fifth-wheel frame, a jack-shaft geared to the front wheels, gearing between the motor and jack-shaft for driving the latter in either direction, at will, a driver's seat supported on the same frame with the motor, and hand operating mechanism for controlling said driving mechanism, substantially as set forth.

6. A motor-vehicle, having mechanism operated by its motor for steering the vehicle, hand-operated means for starting said steering mechanism, and automatic means for arresting the operation of said steering mechanism, substantially as set forth.

7. A motor-vehicle having mechanism operated by its motor for steering the vehicle, hand-operated means controlling said steering mechanism, and automatic spring mechanism for steadying the wheels of the vehicle in running, substantially as set forth.

8. A motor-vehicle having mechanism operated by its motor for steering the vehicle, hand-operated mechanism for setting in motion said mechanism for steering in either direction, automatic means for arresting the operation of the steering mechanism, and automatic means for steadying the wheels of the vehicle in running, substantially as set forth.

9. A motor-vehicle having gearing between its motor and wheels for driving it at will, either forward or backward, hand-operated mechanism for controlling said driving mechanism, mechanism for steering or guiding the vehicle, driven by the vehicle-motor, automatic spring steadying mechanism, and hand-operated means controlling said steering mechanism, substantially as set forth.

10. A motor-vehicle having a non-rotative front axle which turns about a king-bolt, the said king-bolt, mechanism driven by the vehicle-motor for turning said axle about the king-bolt for steering, automatic spring steadying mechanism, and hand-operated means for controlling said steering mechanism, substantially as set forth.

11. A motor-vehicle having a non-rotative front axle which turns about a king-bolt, the said king-bolt, the front vehicle-wheels turning on arms on said axle, the motor, gearing whereby the motor drives said front wheels, mechanism driven by the vehicle-motor for turning said axle about the king-bolt for steering, automatic spring steadying mechanism, and hand-operated means for controlling the operation of said steering mechanism, substantially as set forth.

12. A motor-vehicle having a non-rotative front axle which turns about a king-bolt, the said king-bolt, the front vehicle-wheels turning on arms on said axle, the motor, gearing whereby the motor drives said front wheels, mechanism driven by the vehicle-motor for turning said axle about the king-bolt for steering, hand-operated means for controlling the operation of said steering mechanism, and automatic means for arresting the operation of the steering mechanism, substantially as set forth.

13. A motor-vehicle having a non-rotative axle mounted to turn about its center horizontally for steering the vehicle, motor-operated mechanism for turning said axle about its center, in either direction, hand-operated means for controlling the operation of the last-named mechanism, and automatic means for arresting the operation of the steering mechanism and steadying the wheels in running, substantially as set forth.

14. A motor-vehicle having a body, a rear axle and wheels, a front axle and wheels, the said front axle being non-rotative and adapted to turn about its center horizontally under the body for steering the vehicle, motor-operated mechanism for turning said axle about its center for steering in either direction, automatic means for steadying the wheels in running, and hand-operated means for controlling said steering mechanism, substantially as set forth.

15. A motor-vehicle having a body, a rear axle and wheels, a front axle and wheels, the said front axle being non-rotative and adapted to turn about its center horizontally under the body for steering the vehicle, motor-operated mechanism for turning said axle about its center for steering in either direction, hand-operated means for controlling and setting in operation said steering mechanism, and automatic means for arresting the operation of the steering mechanism, substantially as set forth.

16. In a motor-vehicle, the combination with the motor and its shaft, the jack-shaft, the front vehicle-wheels, the sprocket-wheels on the respective ends of the jack-shaft, the sprocket-wheels on the said front wheels, and the respective driving-chains on said sprocket-wheels, of the forward-driving sprocket-wheel on the motor-shaft, the forward-driving sprocket-wheel rotatable about the jack-shaft, the chain connecting said sprocket-wheels, a clutch which compels the jack-shaft to rotate with said forward-driving sprocket-wheel, and hand-operated means for shifting said clutch, substantially as set forth.

17. In a motor-vehicle, the combination of the motor and its shaft, the jack-shaft, the vehicle-wheels, and the sprocket wheels and chains whereby the vehicle-wheels are driven, of an intermediate shaft driven from the motor-shaft by gearing, the said gearing, the backing sprocket-wheel loose about the jack-shaft, the sprocket wheel and chain whereby said backing sprocket-wheel is driven from said intermediate shaft, a clutch which compels the jack-shaft to rotate with said backing sprocket-wheel, and hand-operated means for shifting said clutch, substantially as set forth.

18. In a motor-vehicle, the combination with the fifth-wheels and their frame, the non-rotative front axle, the springs connecting said axle with the fifth-wheel frame, the front vehicle-wheels, and the jack-shaft, mounted in bearings on said frame, of the telescopic braces between said axle and the bearings of the jack-shaft, substantially as set forth.

19. In a motor-vehicle, the combination with the motor, the vehicle-wheels, the jack-shaft, the gearing between the jack-shaft and the respective vehicle-wheels for driving the latter, the sprocket-wheel $r$ rotatable about the jack-shaft, and the sprocket wheel and chain for driving the wheel $r$ from the motor, of the gearing-box 4 on and rotatable with the jack-shaft and on which the wheel $r$ rotates, the brake-band 7, embracing the boss of the wheel $r$ and having a lug or lugs engaging radial recesses in the said box, the clamping-screw for operating said band, the sliding collar 12, the operating-link 11, connecting the collar with an arm on said screw, the upright lever 13, engaging said collar at one end and the slide 14 at the other end, and hand-operated means for shifting said slide 14, substantially as set forth.

20. In a motor-vehicle, the combination with the body, the fifth-wheels and their frame, adapted to turn under the body, the front axle and wheels supporting said frame, and the motor and its shaft, carried by said frame, of the transverse shaft 20, in said frame and driven from said motor, the bevel friction-wheels thereon, the shaft 27, mounted to play laterally on said frame the friction-wheel 26 thereon, situated between the wheels on the shaft 20, the upright shaft 30 in said frame, gearing between the shafts 27 and 30, whereby the former drives the latter, the rack 32 on the body, the pinion 31 on the shaft 30, and gearing with said rack, and hand-operated means for shifting the shaft 27 laterally, substantially as set forth.

21. In a motor-vehicle, the combination with the body, the fifth-wheel frame on which the body is supported, the motor, the transverse shaft 20 on the frame and driven from the motor, the bevel friction-wheels on said shaft, the shaft 27 on said frame, and the friction-wheel 26, between the wheels on the shaft 20, of the worm on the shaft 27, the upright shaft 30 in said frame, the worm-wheel on said shaft and gearing with said worm, the pinion 31 on the shaft 30, the rack 32 on the body, and gearing with the pinion 31, and hand-operated mechanism for shifting the shaft 27 laterally, substantially as set forth.

22. In a motor-vehicle, the combination with the rotating shaft 20, the bevel friction-gears thereon, the laterally-shiftable shaft 27, and the wheel 26 thereon between the wheels on the shaft 20, of the rock-shaft 34, on the frame, the crank-arm thereon, the link coupling said arm to the bearing of the shaft 27, the operating-lever 37 of the shaft 34, and automatic means for bringing said rock-shaft back to its normal position after it has been rocked and set free, substantially as set forth.

23. In a motor-vehicle, the combination with the rotating shaft 20, the bevel friction-gears thereon, the laterally-shiftable shaft 27, and the wheel 26 thereon between the wheels on the shaft 20, of the rock-shaft 34, on the frame, the crank-arm thereon, the link coupling said arm to the bearing of the shaft 27, the operating-lever 37 of the shaft 34, and automatic means for locking the shaft 27 against accidental rotation when it is out of driving relation with the said rotating shaft 20, substantially as set forth.

24. In a motor-vehicle, the combination with the rotating shaft 20, the bevel friction-gears thereon, the laterally-shiftable shaft 27, and the wheel 26 thereon between the wheels on the shaft 20, of the rock-shaft 34, on the frame, the crank-arm thereon, the link coupling said arm to the bearing of the shaft 27, the operating-lever 37 of the shaft 34, the brake-wheel 38, on the shaft 27, the brake-strap 39, over said wheel, the brake-lever 40, secured to said strap, a spring acting through said lever to set the brake, and the cross-piece 42 on the rock-shaft, on which the lever 40 bears, substantially as and for the purposes set forth.

25. A motor-vehicle having a body, fifth-wheels, a fifth-wheel frame carrying the motor, a front axle and wheels on which said frame is supported, said axle being non-rotative, and a driver's seat mounted on and supported by the fifth-wheel frame, substantially as set forth.

26. A motor-vehicle having hand-operated means for setting the vehicle in motion both forward and backward through the medium of levers, and means coupling said levers whereby one actuates the other, substantially as set forth.

27. In a motor-vehicle, the combination with the fifth-wheels and their frame, the axle on which the said frame is supported, a jack-shaft mounted in the fifth-wheel frame, the ground-wheels on arms on said axle, chain-and-sprocket gearing connecting the jack-shaft and the respective ground-wheels for driving, and longitudinally-adjustable braces between the axle and jack-shaft, substantially as and for the purposes set forth.

28. In a steering mechanism for a motor-vehicle, a continuously-rotating shaft, two cone or bevel driving-wheels secured on said shaft, a cone or bevel wheel between said continuously-rotating bevel-wheels and adapted to be moved into peripheral contact with either at will, a shaft on which the last-named wheel is secured, hand-operated means for shifting said last-named wheel, and automatic means for putting the hand-operated bevel-wheel out of contact with the said cone driving-wheels, substantially as set forth.

29. In a motor-vehicle, the combination with the body, the fifth-wheels and their frame adapted to turn under the body, the front axle and wheels supporting said frame, the motor and its shaft carried by the vehicle, and means between the motor and wheels for driving the vehicle, of the means for steering the vehicle, comprising the transverse shaft 20 mounted on the fifth-wheel frame, means between the motor and said shaft for driving the latter, the bevel-wheels secured on the shaft 20, the rotatively-mounted shaft 27 on the fifth-wheel frame and adapted to play laterally, the bevel-wheel 26 secured on the shaft 27 and situated between the wheels on the shaft 20, hand-operated means for shifting the shaft 27 to put the wheel 26 into engagement with either of the wheels on the shaft 20, and mechanism whereby the shaft 27 turns the fifth-wheel frame under the body, substantially as set forth.

30. A motor-vehicle having a body, a non-rotative front axle, fifth-wheels, a fifth-wheel frame supported on said axle and adapted to turn under the body in steering, ground-wheels on said axle, a motor carried by the vehicle, mechanism between said motor and the ground-wheels for driving the same, means between the motor and axle for steering, a driver's seat mounted on the fifth-wheel frame and turning therewith in steering, so that the driver may always face in the direction the vehicle is moving, and hand-operated mechanism whereby the driver controls the movements of the vehicle, in combination substantially as set forth.

31. A motor-vehicle having a body, fifth-wheels, a fifth-wheel frame under the body, a motor carried by the vehicle, an axle and wheels on which said frame is supported, said axle being integral and non-rotative, and a driver's seat mounted on and carried by said fifth-wheel frame, substantially as set forth.

32. In a motor-vehicle, a rotative driving part, having in it a radial recess, a driving-wheel mounted rotatively on said rotative part, a brake-band embracing the boss of said driving-wheel and having a lug engaging the radial recess in the driving part, and means for causing said brake-band to frictionally embrace said boss, combined and operating substantially as set forth.

In witness whereof we have hereunto signed our names, this 4th day of February, 1901, in the presence of two subscribing witnesses.

WILLIAM OSCAR SHADBOLT.
SYLVESTER J. WETMORE.

Witnesses:
PETER A. ROSS,
HENRY CONNETT.